Patented Sept. 21, 1937

2,093,481

UNITED STATES PATENT OFFICE 2,093,481

HYDROXYDIPHENYL RESIN AND METHOD OF MAKING SAME

Israel Rosenblum, Jackson Heights, N. Y.

No Drawing. Application March 31, 1931,
Serial No. 526,779

12 Claims. (Cl. 260—4)

My invention relates to synthetic resins, and more particularly to resins obtained by the condensation of hydroxy diphenyl (phenyl-phenol) and a carbonyl-containing compound, such as an aldehyde, preferably formaldehyde, and to coating compositions made in part or in whole of such resins.

It is one of the objects of the invention to produce a resin which can be dissolved in the common varnish solvents to yield a coating material having valuable properties. It is a further object of the invention to produce a soluble resin having incorporated therein an unusually large proportion of the carbonyl-compound, preferably formaldehyde. It is also an object of the invention to obtain a resin which is oil-soluble and can be incorporated with China wood oil to produce a varnish of superior quality. It is also an object of the invention to produce a resin in the presence of which China wood oil can be safely heated to high temperatures for comparatively long periods of time to convert the same into a stable polymerized oil without danger of converting such oil into the rubbery state, and at the same time so modify the oil that it will not become depolymerized at lower temperature. Other objects of the invention will appear from the following description and the features of novelty will be pointed out in the appended claims.

According to the present invention, para, meta or ortho-hydroxy diphenyl, or mixtures thereof, but preferably the para compound, or mixtures of such compound with other phenols, are caused to react with an aldehyde or other carbonyl-containing compound, such as a ketone, or mixtures of such compounds, with or without a catalyst. Where a catalyst is employed, I prefer to use a compound of a metal of the second group of the periodic system, such as a compound of zinc, calcium, barium or strontium. The chloride, oxide, carbonate, acetate, tungate, benzoate, abietate or other suitable inorganic or organic compounds of these metals can be employed. I have found that very satisfactory results are obtained with the use of zinc acetate. While the para hydroxy diphenyl has been found by me to give the best results, the meta and ortho compounds may also be used.

In carrying out my invention in its preferred form, I cause para-hydroxy diphenyl to react with formaldehyde to produce a fusible resin which is soluble in the ordinary varnish solvents. I prefer to conduct this reaction in the presence of a metal compound, and particularly of a zinc compound. The metal compound may comprise $\frac{1}{10}\%$ or less of the reacting compounds, but if desired a larger quantity may be employed, say up to 10% of the weight of the hydroxy diphenyl. The metal compound seems to act as more than a catalyst, as it appears to be chemically combined with the resinous condensate. The reaction proceeds more rapidly in the presence of the metallic compound and the final product is superior in quality when a catalyst is employed. The resin remains soluble even if the formaldehyde content is as high as 3 mols for every mol. of the phenol.

My novel resin produces a varnish of very desirable properties when heated with China wood oil. When such resin, produced in the presence of a metal compound, and particularly of a zinc compound, is heated with China wood oil, the temperature may be raised to as high as 280° C. and even higher and kept at such degree for a considerable period of time without danger of converting the oil into a rubbery, useless mass; whereas heretofore such oil could not safely be heated above about 235° C. I have found that an oil which has been so treated is remarkably stable in character and will not depolymerize. A varnish so produced is characterized particularly by great resistance to water and alkalies. If, however, a resin is employed which was produced in the absence of a catalyst of the type above referred to, the oil cannot ordinarily be heated safely to as high a temperature.

The reaction may take place in the presence of any suitable solvent, such as benzol, toluol, alcohol, turpentine, ester gums, phenol-aldehyde-natural resin-metal compound complexes of the type described in my United States Patent Nos. 1,808,716 and 1,809,570 etc.

Very satisfactory results are obtained by first dissolving a phenol-formaldehyde-rosin-metal compound complex in benzol or toluol, and then adding the hydroxy diphenyl and formaldehyde, the latter preferably in aqueous solution. The heating is conducted with refluxing. After dehydration of the mass, a hydroxy diphenyl-formaldehyde condensate is obtained which appears to be chemically combined with the phenol-formaldehyde-rosin-metal compound condensate, the product having properties which make it particularly advantageous for the manufacture of wood oil varnishes. Where free rosin is present, it is preferably neutralized with a polyhydric alcohol, such as glycerol, as described in my above-mentioned patent.

My invention will be better understood with the aid of the following examples, which are given by way of illustration only and not as defining the limits of the invention.

Example 1.—175 grams of para-hydroxy diphenyl, 5 grams of zinc acetate, 225 grams of an aqueous solution of formaldehyde (40%) and 200 grams of benzol are refluxed for 24 hours, at about 100° C. or kept under pressure at slightly higher temperature (about 105-120°) for about 24 hours. The benzol and water are then distilled off and the temperature raised to about 160° C. Vacuum or steam distillation may be used with advantage. When a sample taken from the reacting mass is solid at room temperature and is amorphous or resinous in character, the reaction is completed.

Example 2.—175 grams of para-hydroxy diphenyl and 175 grams of a phenol-formaldehyde-natural resin-organic metal salt condensate produced as described in my said Patents Nos. 1,808,716 and 1,809,570, and preferably a phenol-formaldehyde-rosin-organic zinc salt condensate, either in such form or substantially neutralized with a polyhydric alcohol as described in said patents, are fused together at low temperature. Benzol is added as a solvent or emulsifier, and also 200 grams of aqueous formaldehyde (40%). The mixture is refluxed at about 100° C., or kept under pressure at about 100° C., or slightly higher, for about 24-30 hours. The mass is then dehydrated in any known manner, the benzol being likewise driven off and the temperature then gradually raised to 170° C. When a sample taken from the mass is solid and clear, or fairly clear, at room temperature, the operation is stopped.

Example 3.—The process is carried out as described in Example 1, except that in place of benzol, alcohol, turpentine, or toluol is used as the solvent.

Example 4.—The procedure given under Example 2 may be followed except that instead of using a solvent and aqueous formaldehyde, the solvent may be omitted and solid para-formaldehyde employed.

Variations from the specific proportions and conditions set forth hereinabove may be resorted to within the scope of the appended claims without departing from the spirit of the invention.

I claim:

1. The method which comprises reacting hydroxy diphenyl and an aliphatic carbonyl-containing compound in the presence of a mononuclear phenol-aldehyde-natural resin-organic metal salt condensate until a homogeneous, fusible, soluble, resinous mass is obtained.

2. The method which comprises reacting hydroxy diphenyl and formaldehyde in the presence of a soluble resinous condensate derived from the interaction of phenol and formaldehyde in the presence of a natural resin and of an organic salt of a metal of the second group of the periodic system, until a homogeneous, fusible, soluble, resinous mass is obtained.

3. The method which comprises reacting hydroxy diphenyl and formaldehyde in the presence of an organic compound of zinc, and of a soluble resinous condensate derived from the interaction of phenol and formaldehyde in the presence of a natural resin and of an organic salt of zinc, until a homogeneous, fusible, soluble resinous mass is obtained.

4. The method which comprises reacting hydroxy diphenyl and formaldehyde in the presence of an organic compound of zinc, and of a soluble resinous condensate derived from the interaction of phenol and formaldehyde in the presence of a natural resin and of an organic salt of a solid metal of the second group of the periodic system, said condensate neutralized with a polyhydric alcohol, until a homogeneous, fusible, soluble, resinous mass is obtained.

5. The method which comprises reacting hydroxy diphenyl and an aliphatic carbonyl-containing compound in the presence of a mononuclear phenol-aldehyde-natural resin-organic metal salt condensate, neutralized with a polyhydric alcohol until a homogeneous, fusible, soluble, resinous mass is obtained.

6. A fusible, oil-soluble resinous material obtained by reacting hydroxydiphenyl and an aldehyde in the presence of a condensate of phenol, an aldehyde, a natural resin and an organic compound of a solid metal selected from the second group of the periodic system.

7. A fusible, oil-soluble resinous material obtained by reacting hydroxdiphenyl and formaldehyde, in the presence of a condensate of phenol, formaldehyde, a natural resin and an organic compound of a solid metal selected from the second group of the periodic system, said condensate substantially neutralized with a polyhydric alcohol.

8. The method of producing oil-soluble phenolic condensates which comprises heating approximately 175 grams of hydroxydiphenyl and 175 grams of a condensate of a mononuclear phenol, formaldehyde, an acidic natural resin, an organic zinc salt and glycerol, adding thereto a solvent and approximately 200 grams of 40% formaldehyde solution, heating the mixture at approximately 100° C., dehydrating the mass and expelling the solvent and finally raising the temperature to about 170° C. and continuing the heating until the mass is solid and clear at room temperature.

9. The method of producing a solid, oil-soluble phenolic resin which comprises reacting hydroxydiphenyl and formaldehyde in the presence of an organic salt of zinc until a fusible, soluble resin is obtained which is solid at room temperature.

10. The method of producing a solid, oil-soluble phenolic resin which comprises reacting approximately 175 parts of hydroxydiphenyl and 225 parts of 40% formaldehyde in the presence of zinc acetate until a fusible, soluble resin is obtained which is solid at room temperature.

11. A phenolic resin solid at room temperature and soluble in varnish oils and comprising the reaction product of hydroxydiphenyl and formaldehyde produced in the presence of an organic salt of zinc in accordance with the method of claim 9.

12. A homogeneous fusible resinous material soluble in varnish oils and comprising the reaction product of hydroxydiphenyl and formaldehyde produced in the presence of a mononuclear phenol-aldehyde-natural resin-organic metal salt condensate.

ISRAEL ROSENBLUM.